Patented Nov. 7, 1933

1,934,534

UNITED STATES PATENT OFFICE 1,934,534

PROCESS OF MAKING SYNTHETIC BUILDING BLOCKS FROM LIME

Arthur Hugo Harrison, Gold Pines, Ontario, Canada, assignor to Carbonated Lime Processes Limited No Drawing. Application February 13, 1932
Serial No. 592,851

6 Claims. (Cl. 18—47.5)

This invention relates to the production of synthetic building blocks from lime and relates particularly to the process of prior application, Serial No. 512,999, filed February 2, 1931, when the same is used for the production of blocks, slabs or the like of substantial thickness.

It has been found that, when using the prior process for the production of blocks, slabs or the like having a substantial thickness or diameter, there is difficulty in wholly avoiding cracking of the blocks. The length of the block is immaterial but with a diameter of, say, 6 or 8 inches, which is required in many instances, there is a definite tendency for the blocks to crack or check leaving a product which is not entirely satisfactory.

The object of this invention is thus to overcome this difficulty and to so improve the prior process that blocks of the desired thickness or diameter may be obtained without fear of cracking, during the process of carbonation.

A further object of the invention is to provide a process of producing on these synthetic blocks a strong, smooth surface which will be substantially resistant to damage in handling or use, and which will greatly decrease the tendency for the blocks to absorb moisture.

In the prior process referred to an aerated slurry of lime is subjected to the action of carbon dioxide gas in a heated chamber to carbonate the lime and form a highly porous mass or block of calcium carbonate. In accordance with the present invention, when making blocks of a substantial diameter this porous calcium carbonate is crushed to provide an aggregate which is incorporated with aerated lime slurry and the mixture is subjected to the action of carbon dioxide gas in a heated chamber to carbonate the lime and cause it to harden about the porous calcium carbonate particles. In this way the cracking of the blocks is avoided and the finished blocks contain only calcium carbonate interspersed throughout with cells. The porous character of the material permits the carbonation to proceed to completion and the aggregate being of the same composition as the slurry, the bond between the newly carbonated lime and the aggregate is a secure one.

The size of the particles to which the porous calcium carbonate is crushed may vary widely but it is desirable that the particles be free from dust. Particles passing a screen of one inch opening and being retained on a screen having a one-half inch opening are illustrative of the size of the aggregate particles. Dust adhering to the particles has a tendency to prevent the adherence of the carbonated lime to the aggregate particles. The sized particles should be free from dust. The aggregate is soaked in water so that when it is mixed with the aerated slurry it will not absorb water therefrom and release the air.

The particles of aggregate are surrounded by the aerated lime slurry which fills the voids between the aggregate particles. Molds of perforated or porous material are used to form the mixture into blocks of the required size and shape and the mixture is carbonated in these molds. The perforated molds containing the mixture are preferably loaded on trucks in such a way as to permit free circulation of gas about each mold and the trucks pass into a carbonating tunnel or chamber which is heated to maintain a drying temperature therein. Substantially pure carbon dioxide gas is kept in continuous circulation through the tunnel to cause the carbonation of the relatively thin layer of aerated lime slurry about the aggregate particles. As the carbonating reaction proceeds water is liberated and is removed from the block under the influence of the drying temperature in the chamber.

It will be observed that the amount of lime in the blocks to be carbonated is much less than in the prior process and that this lime is in relatively thin portions or layers. Cracking or other flaws in the blocks are thus avoided. Moreover, as the lime of the slurry carbonates, it tends to fill the exposed cells in the porous calcium carbonate aggregate bonding the whole into a unitary cellular structure.

The carbon dioxide gas should be substantially pure and free from sulphur, which, if present, reacts to form compounds which weaken the blocks.

These blocks are useful for many purposes and particularly in the building arts. In some cases the surface of the blocks is not sufficiently hard and durable to resist the stresses to which the blocks are subjected in handling and/or use. Moreover, for some purposes it is desirable to have the surface of the blocks more resistant to absorption. This invention thus contemplates so improving the blocks as to meet these requirements.

The cellular blocks of calcium carbonate are given a coating of lime hydrate and are again subjected to the action of carbon dioxide in the heated carbonating chamber to change the hydrated lime coating into calcium carbonate. The thickness of the coating may vary within substantial limits. The thicker the coating, the longer it will take to complete the carbonation. In some cases, what may be referred to as a wash or paint coat will be sufficient. In other cases the hydrated lime putty or mortar may be applied in a coating ¼ or ½ inch in thickness.

The surface so formed is strong, smooth and more or less shiny. It is resistant to absorption.

It will be apparent that these blocks consist of a core comprising cells bonded together with calcium carbonate and a surface coat of solid calcium carbonate.

I claim:

1. A process of making cellular blocks of calcium carbonate which comprises incorporating cellular particles of calcium carbonate with an aerated slurry of lime, molding the mixture and subjecting the molded mass to the action of carbon dioxide gas in a heated chamber.

2. A process of making cellular synthetic building blocks which comprises carbonating an aerated slurry of lime, crushing the carbonate so formed, incorporating particles of the cellular carbonate in an aerated lime slurry, placing the mixture in porous molds and carbonating the lime in said slurry to harden the mass.

3. A process of making cellular building blocks from lime which comprises simultaneously drying and carbonating an aerated slurry of lime, crushing the carbonated mass to form porous particles surrounding a mass of said particles with an aerated lime slurry which fills the voids in the mass and subjecting the mixture in porous molds to the action of carbon dioxide gas in a heated chamber to form unitary blocks of cellular calcium carbonate.

4. A process of making cellular blocks of calcium carbonate which comprises incorporating cellular particles of calcium carbonate with an aerated slurry of lime, molding the mixture, subjecting the molded mass to the action of carbon dioxide gas in a heated chamber to harden the mass, then applying a coating of calcium hydrate to the blocks and changing the calcium hydrate to calcium carbonate.

5. A process of making light weight blocks of calcium carbonate which comprises subjecting a mixture of cellular particles of calcium carbonate and an aerated lime slurry to the action of carbon dioxide gas in a heated chamber to harden the mass, coating the surface of the hardened mass with calcium hydrate and carbonating the latter in a heated chamber.

6. A light weight block comprising a core of cellular calcium carbonate and a surface coating of solid calcium carbonate.

ARTHUR HUGO HARRISON.